May 16, 1967 — G. R. SHINDLER — 3,319,661
LINE BLIND
Filed Aug. 10, 1964 — 2 Sheets-Sheet 1
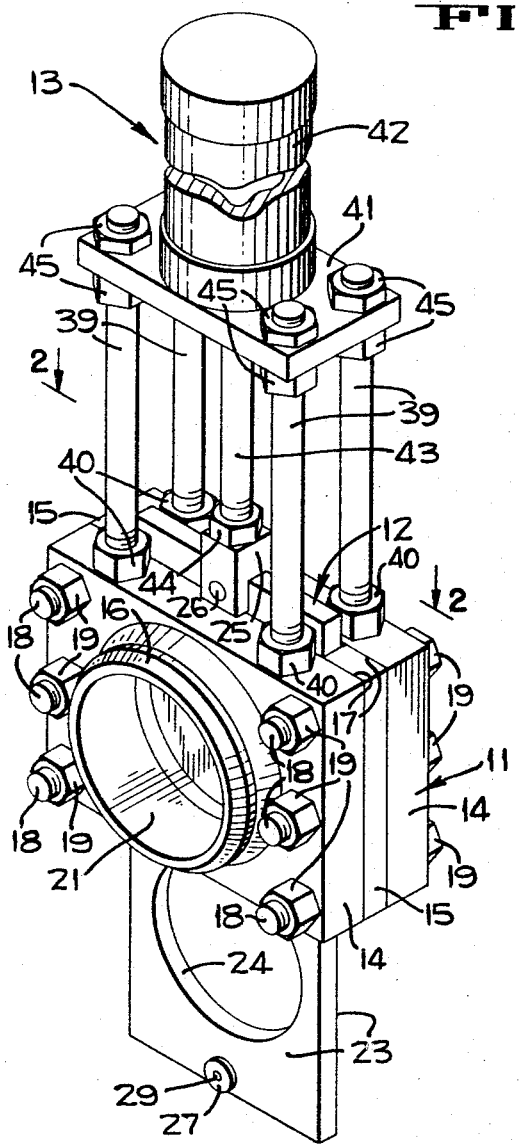
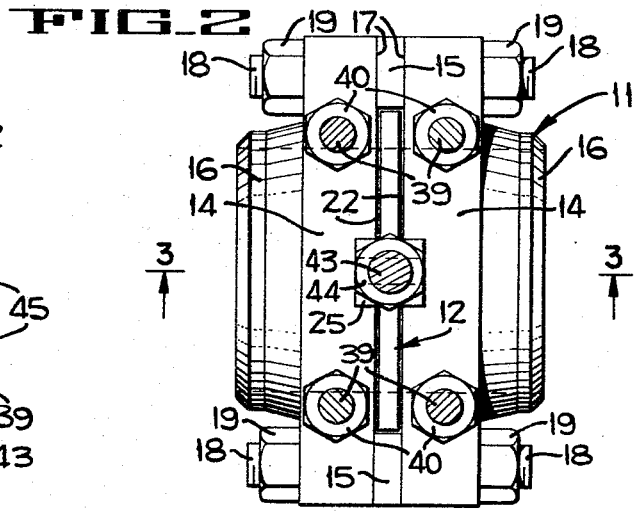
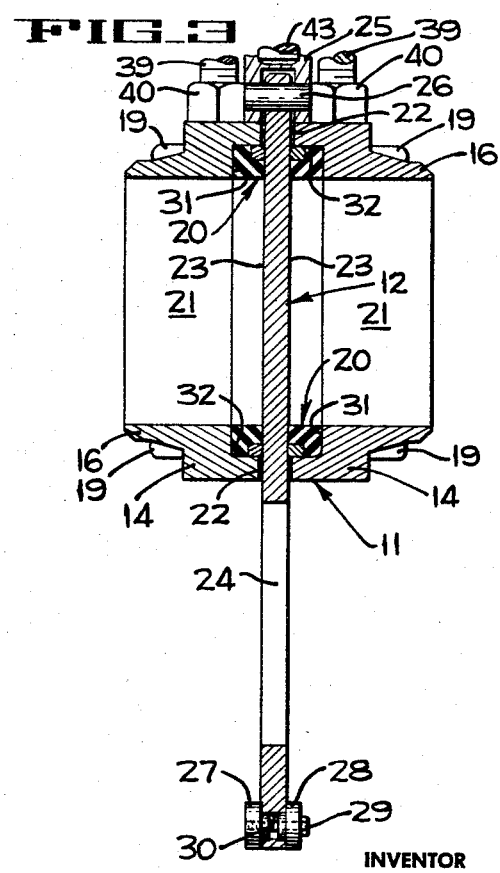
INVENTOR
GEORGE R. SHINDLER
BY *Hans G. Hoffmeister*
ATTORNEY

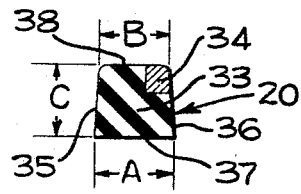
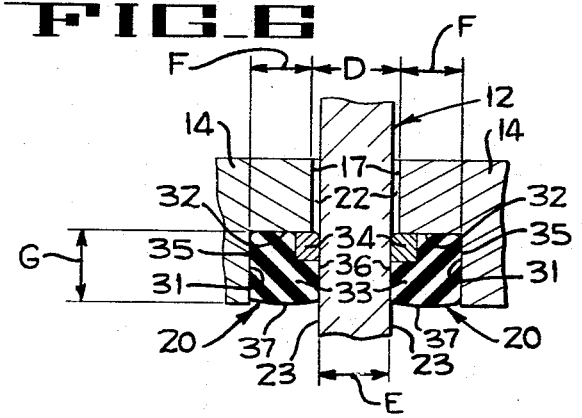
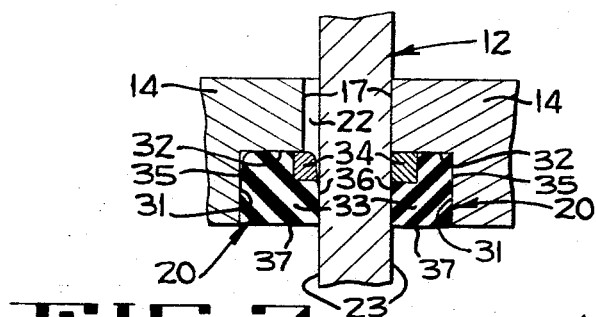
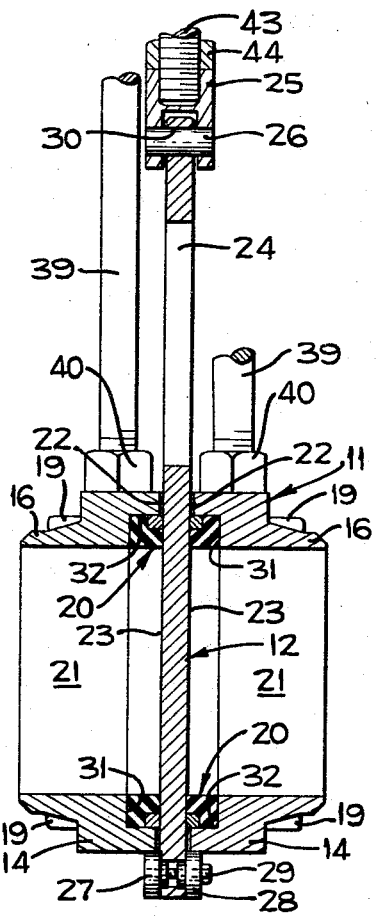

United States Patent Office
3,319,661
Patented May 16, 1967

3,319,661
LINE BLIND
George R. Shindler, Houston, Tex., assignor to FMC Corporation, San Jose, Calif., a corporation of Delaware
Filed Aug. 10, 1964, Ser. No. 388,482
9 Claims. (Cl. 138—94.3)

The present invention concerns an apparatus for the control of the flow of material between material conducting conduits and particularly concerns an improved line blind.

In a network of material conducting conduits it is often required that the flow of material between the conduits past particular points in the network be halted. One type of control device which has been used in the past is generally known as a bonneted gate valve. In this type of device a housing is coupled between two flow conducting conduits. The housing includes a rotatable or slideable gate member which cuts off and permits flow of material between the two conduits. Generally included between the gate member and the housing is a sealing means for reducing leakage of material from between the housing and the gate member. In addition, there is generally provided a bonnet surrounding the housing and the gate member in order to accumulate material which has leaked from between the housing and gate member, and also to minimize introduction of foreign matter from atmosphere to the gate member. A gate member actuating linkage usually extends into the bonnet and connects with the gate member. A second seal is generally provided to prevent leakage between the linkage and the bonnet. In this type of device all parts are generally closely interfitted with each other within the range of machinability. The seals used with this type of device wear and become deficient in their sealing abilities with usage and the passage of time. It has been found that increased leakage past the seal between the gate member and housing causes a fluid pressure to accumulate in the bonnet. This pressure has been found to cause collapse or weakening of the seals when the pressure within the bonnet is greater than the pressure within the conduits. Pressure in a conduit is frequently reduced below the pressure in the bonnet when for example, the gate member is positioned to cut off flow between the conduits and material in one of the conduits is then drained off or allowed to remain therein at atmospheric pressure.

In order to obviate the pressure buildup problem of the bonneted gate valve, there has been developed another type of flow control device known generally as a line blind. In a line blind, a housing is coupled between two flow conducting conduits. There is also provided a flow control member known generally as an aperture plate or gate. One end of the gate has provided therein an aperture and the other end is blinded, i.e., imperforate. When material flow between the two conduits is desired, the gate is slid into position such that the aperture is within the housing and material may flow therethrough. When material flow between the conduits is desired to be cut off or prevented, the gate is slid across the housing such that the imperforate end of the gate is disposed within the housing. Seals are provided between the housing and the gate to minimize leakage from the housing. Any leakage which does occur, of course, is simply vented to the external surface of the housing. There is no surrounding bonnet to accumulate leaked material and consequent fluid pressure.

In the past, however, in order to provide for effective sealing between the gate and the housing, some means other than the natural resiliency of the seals themselves has been required. This was usually provided in one of two different ways. One way was by designing the resilient seal in such a manner as to fit into a particularly designed seal-receiving recess such that pressure of the material physically moved the seal in the recess toward the gate and thus presses the seal more firmly into contact with the gate. It was found, however, that when material containing powdered particles was conveyed through such a line blind the particles worked themselves into the seal holding recess and prevented the seal from making efficient contact at all times with the recess. Increased leakage thus occurred.

Another way of increasing the sealing effect of the seal with the gate was achieved by providing separate seal-holding members which are movable with respect to the housing and gate. The seal-holding member is forcibly held against the housing and the gate with a force great enough to prevent pressure from ever moving the seals out of contact with the housing and gate. However, such force is generally so great that movement of the gate with respect to the housing, such as when it is desired to cut off flow, is generally very difficult if not impossible without damage to the seals. Hence, in this type of line blind, provision is made for relieving the force of the seal-holding member prior to moving the gate. The gate is then moved, and the seal-holding member is then forced back into seal forcing position. Such an apparatus requires an undesirable multiplicity of separate parts and a number of time-consuming operational steps involved in changing the position of the gate.

Accordingly, it is an object of the present invention to provide an improved flow control apparatus of the line blind type.

Another object of the present invention is to provide a line blind having improved sealing means.

Still another object of this invention is to provide an improved line blind comprising a minimum of parts.

Yet another object of the present invention is to provide an improved line blind wherein the flow control member need not be closely fitted with other parts of the line blind.

Another object of the present invention is to provide an improved line blind wherein pressure of material aids sealing between movable parts of the blind.

A still further object of this invention is to provide an improved line blind having but a single movable part.

A further object of this invention is to provide an improved line blind whose gate is movable by means of a single operation.

Another object of this invention is to provide an improved line blind whose gate is reversible.

Yet another object of the present invention is to provide an improved line blind utilizing a sealing means which is not affected by powdered particles.

These together with other objects will become apparent from the following description when read in connection with the accompanying drawings in which:

FIGURE 1 is a perspective view of a preferred embodiment of the line blind of the present invention.

FIGURE 2 is a horizontal cross-section taken on line 2—2 in FIG. 1.

FIGURE 3 is a vertical cross-section taken on line 3—3 in FIG. 2.

FIGURE 4 is a view similar to FIG. 3 illustrating the reversible gate feature of the present invention.

FIGURE 5 is an enlarged cross-section of a typical sealing ring used in the line blind of FIG. 1.

FIGURE 6 is an enlarged partial cross-section of the present invention illustrating the arrangement of the seals, the gate, and the body members under one condition of operation.

FIGURE 7 is an enlarged partial cross-section of the present invention illustrating the arrangement of the seals, the gate, and the body members under another condition of operation.

In FIGURE 1, a line blind is shown comprising a housing or body 11 into which a flat flow control gate or aperture plate 12 is slidably disposed. On the upper portion of the housing 11 an actuating means 13 for moving the gate 12 is disposed.

The housing 11 comprises two identical connecting body members or flanges 14 plus a pair of identical spacer members or blocks 15. As shown in FIGURES 1, 2 and 3, the flanges 14 are each provided with a conduit connecting member 16. Substantially flat outer surfaces or walls 17 of each flange 14 are maintained spaced apart from each other a fixed predetermined distance by the spacer blocks 15 which are disposed between portions of the outer walls 17 at two opposite sides of the flanges 14. The flanges 14 and spacer blocks 15 are securely maintained together by a plurality of studs 18, which extend through aligned holes (not shown) in the blocks and flanges, and screwed-on nuts 19.

Each flange 14 is provided with a material conducting bore or passageway 21 which extends from the outer wall 17 to the end of the conduit connecting member 16. The bores 21 are in alignment thereby providing a passageway completely through the housing 11. As clearly illustrated in FIGS. 2 and 3, a slot or gap 22 is formed by the blocks 15 and the confronting outer walls 17. The gap 22 thus extends across the passageway defined by bores 21.

In order to control flow of material between bores 21, the flow control gate 12 is disposed in the gap 22. The gate 12 is provided with opposite flat surfaces or faces 23 which are separated by a distance less than the distance separating confronting outer walls 17. There is thus no attempt to make the gate 12 close fitting with outer walls 17, as more clearly illustrated in FIG. 6.

At one end of the gate 12 there is provided an aperture 24 extending between faces 23. The diameter of aperture 24 is illustrated as being substantially equal to the diameter of bores 21. However, if desired, the diameter of aperture 24 may be less than the diameter of bores 21. The other end of plate 12 is blinded, i.e., the other end is imperforate.

At the upper end of gate 12, as illustrated in FIGURES 1 and 3, a link or clevis 25 is attached by a pin 26 inserted through aligned pin receiving holes provided in the arms of the clevis 25 and in the gate 12. The outer ends of the arms of the clevis extend downward and engage the top portion of flanges 14 in one of the limiting positions of the gate. With the gate 12 oriented as shown in FIGURES 1 and 3, the arms of clevis 25 thus serve as a stop means for positioning the gate 12 vertically in gap 22 such that the imperforate portion of the gate 12 cuts off material flow between bores 21.

At the opposite end of the gate 12, as illustrated in FIGURES 1 and 3, a lower stop means for accurately limiting movement of the gate 12 in the opposite direction is formed by inserting an internally threaded cap 27 and smooth-bored cap 28 into opposite ends of a hole 30 provided at the lower end of the gate 12. The caps 27 and 28 are maintained in the receiving hole 30 by a cap screw 29 inserted through the bore of cap 28 and screwed into the threaded bore of cap 27.

When gate 12 is moved vertically upward, the caps 27 and 28 engage the bottom surfaces of flanges 14 and prevent further upward movement of gate 12. As shown in FIGURES 1 and 3, the receiving hole 30 for the caps 27 and 28 and the caps themselves are so positioned and dimensioned that when the caps are in contact with the flanges 14, the aperture 24 is aligned with bores 21.

One of the features of the present invention is the reversibility of the gate 12 with respect to the actuating means 13. As shown in FIGURE 4, the gate 12 is disposed in the gap 22 such that the aperture 24 and hole 30 are at the upper end of the gate 12. This is accomplished by simply detaching the clevis 25 and the caps 27 and 28 from the gate, removing the gate from the gap, inverting the gate, inserting the reversed gate back into the gap and attaching the clevis and caps to the gate at the opposite ends from their original locations.

As illustrated in FIG. 4, the clevis 25 now serves as a stop for accurately positioning the aperture 24 in line with bores 21 as the arms of the clevis contact the top of the flanges 14. Likewise, with the gate 12 in the reversed position of FIG. 4, the caps 27 and 28 serve as a stop for assuring that the imperforate end of the gate 12 is positioned between the bores 21. Further advantages of the reversible gate will be pointed out as the description proceeds.

Since the gate 12 is loosely fitted between the walls 17 of flanges 14, sealing means are provided between the gate and the flanges. As illustrated in FIGURES 3, 4, 6 and 7, each flange 14 is provided with a counterbore defined by a radially extending annular inner wall 31 and an axially extending annular intermediate wall 32. The intermediate wall extends axially between the inner wall 31 and the wall 17 of the flange. The inner wall 31 extends radially between the wall of the bore 21 and the intermediate wall 32. Since the outer walls 17 are maintained a first fixed distance apart from each other by blocks 15, the inner walls 31 are accordingly maintained in confronting relation to each other and spaced apart a second fixed distance.

Disposed within each counterbore is an annular resiliently compressible seal 20. The seal 20 comprises an annular body of rubber-like material 33 which is resilient. In addition, the seal 20 includes a reinforcing and anti-extrusion ring 34 disposed at a radially outer corner of the body. The purpose of the anti-extrusion ring 34 will be explained in full in the subsequent description of the operation of the line blind.

In its free unstressed condition, the seal is preferably trapezoidal in cross-section as shown in FIGURE 5. Back and front side surfaces 35 and 36 respectively converge by a small angle, from radially inner surface 37 toward radially outer surface 38. Thus, the axial width of surface 37 is greater than the axial width of surface 38. The radial depth of the body is substantially equal to the radius of the inner wall 31 of the counterbore. Table 1, infra, lists typical dimensions in a preferred embodiment of the present invention, it being understood that the subject invention is not limited to these dimensions. These dimensions have been very suitable for a six-inch blind, that is, a blind with a six-inch diameter aperture 24. Reference letters in the table correspond to the reference letters of FIGS. 5 and 6.

TABLE I

| | Inch |
|---|---|
| Width A | 0.667 |
| Width B | 0.637 |
| Depth C | 0.631 |
| Width D | 0.675 |
| Width E | 0.657 |
| Width F | 0.627 |
| Depth G | 0.654 |

Width A is greater than the distance between an inner wall 31 of a flange 14 and the confronting face 23 of the gate 12, when the gate is disposed axially of the bores 21 and in abutting relation with the outer wall 17 of the opposite flange 14 as clearly illustrated in FIG. 7. Thus, no matter what the axial disposition of the gate 12 in gap 22, the seals are resiliently compressed between an inner wall 31 and a confronting face 23 of the plate. By providing that the dimension of surface 37 be greater than the dimension of surface 38 there is thus always provided a lip type sealing action at the radially inner portion of inner wall 31 and at the portion of the face 23 abutting the radially inner end of front surface 36. This lip-type sealing action prevents material contained within bores 21 from working its way between the seal and abutting walls and surfaces, an important advantage of the subject line blind.

Table 1 also lists typical dimensions for the thickness E of gate 12 and the distance D separating confronting walls 17 of the flanges 14. It is to be noted that the distance D is greater than the width A of seal body inner surface 37. Thus, the gap 22 is wide enough to provide for easy insertion and removal of the seal ring 20 as more fully described hereinafter.

When the imperforate end of gate 12 is positioned between the bores 21 and material under pressure is contained within a bore 21, the pressure is impressed on the adjacent surface 23 of gate 12 and on the exposed inner surface 37 of seal body 33. Such pressure urges the seal body radially outward. If the pressure is great enough there is generally a tendency for the material of the body to flow into the space between the outer wall 17 and confronting face 23 of gate 12. As illustrated in FIGURE 7, such tendency to flow is overcome by the anti-extrusion ring 34 which is disposed on the body 33 such that no part of the body 33 communicates with the aforementioned space.

An actuating means 13 is provided to selectively move the gate 12 across the passageway formed by bores 21 when it is desired to permit or prevent flow of material between the bores.

A typical actuating means 13 is illustrated in FIGURE 1. Two upstanding studs or support rods 39 are threaded into holes (not shown) provided in each flange 14 and are securely locked to the flange by lock nuts 40.

A rectangular support member 41 having holes (not shown) at each corner is positioned over the upper ends of rods 39 and secured thereto by lock nuts 45. On the upper surface of the support member there is suitably attached a linear actuator. The actuator illustrated is a pneumatic cylinder-piston 42. However, other suitable actuators, such as an electrically operated solenoid or a manually operated jack may be used. This unit includes a piston (not shown) and an actuating or piston rod 43 attached to the piston. The rod 43 passes out of the cylinder, through a hole (not shown) in the support member 41 and extends below the support member 41. The lower end of the rod 43 is externally threaded and screwed into an internally threaded hole of clevis 25. The clevis 25 and rod 43 are locked together by a lock nut 44, as more fully illustrated in FIG. 4.

The piston in the cylinder 42 is selectively vertically moved by means of air introduced under pressure into the cylinder by suitable controls (not shown) which may be situated close by the actuator 13 or remote therefrom as desired. As shown in FIG. 1, the rod 43 is extended outward of cylinder 42 and the clevis is engaged upon the upper surface of the flanges 14. Thus, the gate 12 is in its full lower position and the imperforate end of the gate is between the bores 21 of the flanges. Upon retraction of the rod 43 into the cylinder 42, the gate 12 is lifted or moved upwardly in gap 22 until caps 27 and 28 engage the bottom surfaces of the flanges 14. Thus the aperture 24 is moved into position between the bores 21.

If the gate 12 is in the inverted position, as illustrated in FIG. 4, the actuator 13 still operates to move the gate 12, except that extension of the rod 43 moves the aperture into position between the bores 21 and retraction of the rod 43 moves the imperforate end of gate 12 into position between bores 21. It is to be understood that the embodiments illustrated and heretofore described may be operated in any suitable position. For instance, the actuating cylinder 42 and rod 43 may be disposed below or alongside the flanges so long as the flanges are also suitably disposed so that the rod 43 may move the gate 12 in the gap 22.

As illustrated in FIG. 6, it is seen that when there is no pressure differential between the bores 21, the resiliency of the sealing rings 20 axially center the gate 12 in gap 22. The back side surfaces 35 of seal bodies 33 are in substantially full contact with inner walls 31 of their respective associated flanges 14. Likewise, the front side surfaces 36 and the anti-extrusion rings 34 are in contact with their respective associated flat faces 23 of gate 12.

When pressure within one of the bores 21 is greater than in the other bore, as when the imperforate end of the gate 12 is between the bores 21 and material in one of the bores is under a greater pressure than material in the other bore, the gate 12 is moved axially in the gap 22 in the direction toward the bore having the lower pressure.

As illustrated in FIG. 7, it is assumed that the bore 21 of the left hand flange 14 contains material under a higher pressure than material in the bore 21 of the right hand flange. It is to be understood that the word material includes gaseous, liquid, and flowable solids such as finely divided powder-like matter. The pressure acting upon the left hand face 23 of gate 12 overcomes the resilient forces of the right hand seal body 33 and pushes or urges the gate 12 to the right and against the outer surface 17 of the right hand flange 14.

As the gate 12 is urged toward the right, the resiliency of the left hand seal body 33 causes the body to axially expand and thereby maintain effective sealing contact of its front side surface 36 with its associated left hand face 23 of gate 12 and of its back surface 35 with wall 31. In addition, the pressure of material in the left hand bore 21 acts radially outward against the inner surface 37 of the body 33; this pressure is transmitted throughout the body 33 and thus further urges the left seal 20 into more firm engagement with the associated inner wall 31 and the lefthand face 23. Thus, the pressure of material within a bore 21 aids the seal body in maintaining firm sealing engagement. Any tendency of the left seal to flow radially outward into gap 22 is overcome by the associated anti-extrusion ring 34.

Movement of the gate 12 to the right against the outer surface 17 of the right hand flange 14 merely compresses the right hand seal body 33 axially between the gate 12 and the right hand inner wall 31.

In the event that material should leak from between the seals 20 and the gates 12, the leaked material is merely admitted to the atmosphere. This leakage has no effect on the other seal as is found in the bonneted type of valves mentioned previously.

In general, it has been found that the gate of a line blind type of flow control device is best moved when there is little or no pressure within the bores disposed on either side of the gate. In the present invention the gate 12, likewise may be readily moved while low pressure is present in either or both the right and left hand bores 21 and without adverse effects.

It has also been found that when the present invention is utilized for flow control of liquids, it is generally desirable to have the apertured end of the gate 12 at the upper end, as in FIG. 4. Thus, if liquid is contained within the bores 21 only a small amount of liquid will escape upward through the aperture 24 into the gap 22 as the gate 12 is moved in the gap. The escaped liquid will then drain downward and out of the gap 22. Of course the action of the actuator 13 should be as rapid as possible in order to minimize escape of material especially when under positive pressure.

When the present invention is utilized in control of flow of powdered-like material, such as powdered cement, it has been found desirable to have the aperture 24 at the lower end of the gate 12 as illustrated in FIG. 3. When the gate 12 is moved by the actuator 13, any spillage of powder-like material takes place downward and hence easily drops out of the gap 22 onto the ground beneath. Thus, material does not collect on top of the blind or pack into the space between the gate 12 and the surfaces 17 of the flanges 14.

Since one end of the gate 12 is always exposed to atmosphere, there is the possibility that a small amount of dirt may be clinging to the exposed faces of the gate at the time the exposed end is moved between the bores 21. The anti-extrusion rings 34 serve the additional function of wiping or scraping dirt from the faces 23 of the gate 12 thereby providing substantially clean faces for sealing contact with the seal bodies 33.

The simplicity of construction of a line blind embodying the present invention also presents another important advantage having to do with the necessity or desirability of replacing the seals 20 from time to time. Replacement of the seals 20 is a relatively easy and simple process due to the arrangement of parts of the blind. The pin 26 connecting the clevis 25 with the top of the gate 12 is removed.

The gate 12 is then manually removed from the gap 22 by simply pulling the gate downward out of the gap. A tool, such as a screwdriver is then inserted into the gap 22 and is manipulated to draw the seal 20 out of the counter-bore and then either upwardly or downwardly out of gap 22, it being noted that the seals 20 are not under radial precompression in the counterbores. Likewise, new seals may be inserted into the gap and easily manipulated into the counterbores by means of a screwdriver. The gate 12 is then inserted upwardly into the gap 22 and attached to clevis 25 by reinserting pin 26. Thus, it is seen that the housing comprising two flanges 14, spacer blocks 15, studs 18 and nuts 19 need not be disassembled in order to replace the seals 20 as is common with most prior art line blinds.

There has thus been illustrated and described an improved flow control device of the line blind type. According to the disclosure and teaching of the present invention, the flow control device utilizes an improved means for sealing between an aperture gate and a housing into which the gate is slidably disposed. The arrangement of the housing and gate is such that the parts need not be closely fitted thus enabling easy and economical fabrication of parts. The arrangement of the parts making up the flow control device is such that pressure within the bores or passageway of the housing aids effective sealing action of the seal ring with the aperture gate.

Although a preferred embodiment of the present invention has been shown and described, it will be understood that the various changes and modifications may be made in the details thereof without departing from the spirit and the scope of the appended claims.

That which is claimed and desired to be protected by Letters Patent is:

1. A line blind comprising wall means including a main wall surrounding a passageway, confronting annular inner walls projecting outward relative to the main wall in axially spaced relation to each other, annular intermediate walls extending axially toward each other from their respective inner walls, and confronting annular outer walls projecting outward from respective intermediate walls and axially spaced a first predetermined distance apart, said outer walls defining a gap therebetween which communicates with the atmosphere; annular resiliently compressible seals surrounding the passageway and having back and outer surfaces respectively engaging said inner and intermediate walls and having front surfaces axially spaced from each other in their unstressed condition by a second predetermined distance less than said first distance; a gate having opposite faces and a thickness measured between said faces greater than said second distance but less than said first distance, said gate being positioned between said confronting walls and in said gap with said opposite faces engaging the front surfaces of the seals; means for sliding said gate relative to the seals while maintaining the outer walls at said first distance from each other and wherein said gate is axially movable in opposite directions between positions with its opposite faces engaging their respective confronting outer walls; and said seals each having an inner surface of a greater width axially of said passageway than any other portion of said seal so that the seal inner surface maintains contact with the gate faces and inner walls irrespective of the axial position of said gate.

2. In a line blind, a body including separable first and second sections assembled together and providing a fluid passageway therethrough, said sections having confronting outer walls defining a gap between the sections, means positioned between and engaging said outer walls so as to hold the outer walls in predetermined spaced relation to each other, a gate positioned in said gap and being movable therein transversely of said passageway, and resiliently compressible sealing means engaging opposite faces of said gate and precluding escape of material from the passageway through said gap to the exterior of the body, said sealing means having inner surfaces extending axially of said passageway a distance greater than any other portion of said sealing means whereby said inner surfaces remain in contact with said outer walls and said gate during movement of said gate axially of said passageway.

3. A line blind comprising a first material conducting conduit, a second material conducting conduit, each of said conduits having a bore therethrough, and having a connecting flange formed on one end thereof, each of said conduits being provided with an annular recess circumscribing its corresponding bore and having a surface facing axially outwardly toward said one end of the conduit; spacer means disposed between said flanges and maintaining said flanges spaced apart a predetermined distance with said bores in alignment, each of said recesses being provided with an annular seal ring, said annular seal rings each having an inner surface, said inner surface extending axially of said bore a distance greater than any other portion of said seal ring, a flow control gate disposed between said flanges and said spacer means; said gate having opposite faces disposed in confronting relation with respective flanges, said faces being separated by a distance less than said predetermined distance; actuating means attached to said gate for moving said gate transversely of the axis of said bores; a first stop means removably attached to said gate and engageable with said flanges for halting movement of said gate in one direction, and a second stop means removably attached to said gate and engageable with said flanges for halting movement of said gate in another direction, respective ones of said seal rings being compressed axially between a respective axially facing surface of a recess and a confronting surface of said gate.

4. The line blind of claim 3 wherein said gate moving means is a fluid operated actuator.

5. A line blind comprising two substantially identical material conducting conduits each having a bore therethrough, each of said conduits having formed thereon a radially extending flange at one end thereof, each of said conduits being further provided with an annular recess having a radially extending surface facing toward said one end of its conduit; spacer means disposed between flanges and maintaining said ends of said conduits spaced apart a predetermined distance with said bores in alignment; a flow control gate disposed between said flanges and said spacer means, said gate having substantially parallel opposite faces extending in a direction transverse to the axes of said bores, said gate being of a thickness between said opposite surfaces of less than said predetermined distance, said gate having an aperture formed in one portion and extending therethrough between said generally parallel surfaces; an actuating means for moving said gate between said ends of said conduits in directions transversely of the axes of said bores; said actuating means including link means operably connected to said gate and being engageable with said flanges for halting movement of said gate in one direction such that said aperture is in registration with said bores; stop means attached to said gate and engageable with said flanges for halting movement of said gate in another direction such that said aperture is not in registration with said bores; and annular seal rings disposed in each of said recesses, said annular seal rings each having an inner surface, said inner surface extending axially of said bore a distance greater than any other portion of said seal ring, respective ones of said rings being compressed axially between a radially extending surface of said recess and a confronting surface of said gate.

6. The line blind according to claim 5 wherein said aperture is formed at one end of said gate, and wherein the opposite end of said gate is imperforate, said imperforate end being disposed between said ends of said bores when said aperture is out of registration with said bores.

7. A line blind comprising two substantially identical material conducting conduits each having a bore therethrough, each of said conduits having formed thereon a radially extending flange at one end thereof, each of said conduits being further provided with an annular recess having a radially extending surface facing toward said one end of said conduits; spacer means disposed between said flanges and maintaining said ends of said conduits spaced apart a predetermined distance with said bores in alignment; a flow control plate disposed between said flanges and said spacer means, said plate having substantially parallel opposite faces extending in a direction transverse to the axes of said bores, said plate being of a thickness between said opposite surfaces of less than said predetermined distance, said plate having an aperture formed therein and extending therethrough between said generally parallel surfaces; said aperture being formed at one end of said plate, the end opposite said one end of said plate being imperforate, an actuating means for moving said plate between said ends of said conduits in directions transversely of the axes of said bores; said actuating means including link means operably connected to said plate and being engageable with said flanges for halting movement of said plate in one direction either end of said plate being connectable with said link means; and annular seal rings disposed in each of said recesses, said annular seal rings each having an inner surface, said inner surface extending axially of said bore a distance greater than any other portion of said seal ring, respective ones of said seal rings being compressed axially between a radially extending surface of said recess and a confronting surface of said plate.

8. The line blind according to claim 7 wherein said actuating means also includes a fluid operated actuator and a connecting rod coupled between said link means and said actuator.

9. The blind of claim 7 including stop means connected to the opposite end of said plate from said link means and engageable with said flanges for halting movement of said plate in a direction opposite to said one direction, said stop means being connectable to either end of said plate.

References Cited by the Examiner

UNITED STATES PATENTS

| | | | |
|---|---|---|---|
| 2,278,848 | 4/1942 | Hamer | 138—94.3 |
| 2,952,437 | 9/1960 | Knox | 251—195 |

FOREIGN PATENTS

| | | |
|---|---|---|
| 57,121 | 12/1952 | France. |
| 435,277 | 9/1935 | Great Britain. |

LAVERNE D. GEIGER, *Primary Examiner.*

SAMUEL ROTHBERG, *Examiner.*

T. L. MOORHEAD, *Assistant Examiner.*